(12) United States Patent
Koukoumidis et al.

(10) Patent No.: US 10,878,307 B2
(45) Date of Patent: Dec. 29, 2020

(54) EQ-DIGITAL CONVERSATION ASSISTANT

(71) Applicant: Microsoft Technology Licensing, LLC, Redmond, WA (US)

(72) Inventors: Emmanouil Koukoumidis, Kirkland, WA (US); Daniel Massey, Redmond, WA (US); Dustin Abramson, Bellevue, WA (US); Donald F. Brinkman, Jr., Seattle, WA (US); Scott A. Schwarz, Seattle, WA (US); Sergei Tuterov, Redmond, WA (US); Ying Wang, Redmond, WA (US); Qi Yao, Bellevue, WA (US); Adam E. Shirey, Renton, WA (US); Maria Alexandropoulou, Kirkland, WA (US); Kelli Stuckart, Redmond, WA (US); Hudong Wang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 926 days.

(21) Appl. No.: 15/389,817

(22) Filed: Dec. 23, 2016

(65) Prior Publication Data

US 2018/0181854 A1 Jun. 28, 2018

(51) Int. Cl.
| | | |
|---|---|---|
| *G06N 3/00* | (2006.01) | |
| *G06Q 10/06* | (2012.01) | |
| *G06N 20/00* | (2019.01) | |

(52) U.S. Cl.
CPC ............. *G06N 3/006* (2013.01); *G06N 20/00* (2019.01); *G06Q 10/06395* (2013.01)

(58) Field of Classification Search
CPC .......... G06N 3/006; G06Q 10/06395
(Continued)

(56) References Cited

U.S. PATENT DOCUMENTS 6,151,571 A 11/2000 Pertrushin
6,757,362 B1 6/2004 Cooper et al.
(Continued)

FOREIGN PATENT DOCUMENTS

WO 2016022862 A1 2/2016

OTHER PUBLICATIONS

Kim, et al., "Meeting Mediator: Enhancing Group Collaboration using Sociometric Feedback", In Proceedings of the ACM conference on Computer supported cooperative work, Nov. 8, 2008, pp. 457-466.

(Continued)

*Primary Examiner* — Shane D Woolwine
(74) *Attorney, Agent, or Firm* — Merchant & Gould

(57) ABSTRACT

Systems and methods for receiving various input data, processing said input data, and utilizing artificial emotional intelligence to analyze said input data to return calculated response stimuli are provided. Various electronic devices may be utilized to acquire input data related to a specific user, a group of users, or environments. This input data, which may comprise tone of voice, facial expressions, social media profiles, and surrounding environmental data, may be compared with past data related to a certain user, group of users, or environment. The systems and methods herein may employ artificial emotional intelligence to evaluate the aggregated data and provide a response stimulus to a user or group of users. The response stimulus may be in the form of uplifting/encouraging music, quotes, pictures, jokes, suggestions, etc. The purpose of providing the response stimuli is to significantly increase the productivity of meetings, conversations, and other interactions across electronic devices.

20 Claims, 14 Drawing Sheets

(58) Field of Classification Search
USPC .......................................................... 706/11
See application file for complete search history.

(56) References Cited

U.S. PATENT DOCUMENTS

| | | |
|---|---|---|
| 9,138,186 B2 | 9/2015 | Price et al. |
| 2011/0022395 A1 | 1/2011 | Konchitsky et al. |
| 2011/0283190 A1 | 11/2011 | Poltorak |
| 2014/0122619 A1* | 5/2014 | Duan .................... G06F 40/20 709/206 |
| 2014/0365355 A1* | 12/2014 | Shvarts ................ G06Q 40/02 705/38 |
| 2015/0046375 A1* | 2/2015 | Mandel .................. G06T 13/80 706/11 |
| 2015/0053066 A1 | 2/2015 | Hampiholi et al. |
| 2015/0162000 A1 | 6/2015 | Di Censo et al. |
| 2016/0300570 A1* | 10/2016 | Gustafson ............ G10L 15/265 |
| 2016/0343378 A1* | 11/2016 | Chen ...................... G10L 17/22 |
| 2017/0300939 A1* | 10/2017 | Chittilappilly ......... G06N 20/00 |

OTHER PUBLICATIONS

Carolis, et al., "A Multimodal Framework for Recognizing Emotional Feedback in Conversational Recommender Systems", In Proceedings of the 3rd Workshop on Emotions and Personality in Personalized Systems, Sep. 16, 2015, 8 pages.

Wang, et al., "New approaches to mood-based hybrid collaborative filtering", In Proceedings of the Workshop on Context-Aware Movie Recommendation, Sep. 30, 2010, 6 pages.

* cited by examiner

EQ-DIGITAL CONVERSATION ASSISTANT

BACKGROUND

Every organization strives to increase productivity. In recognition of the importance of productivity, many companies have developed tools that help individuals and teams work more efficiently. However, efficiency captures only a small part of what makes a team and subsequently, a whole organization successful. As studies have proven, an individual's performance depends greatly on the individual's emotional state. Similarly, a team's cumulative value and overall productivity is largely influenced by the quality of the team-member interactions with each other.

It is with respect to these and other general considerations that example aspects, systems, and methods have been described. Also, although relatively specific problems have been discussed, it should be understood that the examples should not be limited to solving the specific problems identified in the background.

SUMMARY

The disclosure generally relates to systems and methods for monitoring user emotional states or communication style and using an artificial-intelligence-based digital conversation assistant ("DCA") to provide appropriate response stimuli based on the input data received. In one example, the user may request and/or opt-in for detection of user reactions to conversational content for various purposes, such as annotating the content of a business meeting based upon how the participants reacted to at least one portion of the business meeting. The DCA may be a program that receives various types of input data, such as audio data (e.g., tone of voice), visual data (e.g., facial and body expressions), environment data (e.g., specific location), biometric data (e.g., heart rate), participant data (e.g., social media profiles), and solicited feedback from participants. For example, a device (e.g., a mobile phone, a laptop, a tablet device, vehicle instrumentation, a television, an electronic billboard, and/or other devices) may comprise one or more sensors, such as a camera, a motion sensor (e.g., an accelerometer or gyroscope), a GPS device, a microphone, and/or other sensors that may sense and obtain the input data. The DCA then processes that input data by combining it with previously stored data. The previously stored data may comprise past emotional data on users, how certain users responded to specific types of response stimuli, environment data, public information, and other relevant data. Once the newly received input data is combined with the past data, the DCA determines at least one appropriate response stimulus to provide to the user or group of users. The DCA may provide a private, individualized response stimulus to a single user or a group response stimulus to multiple users. The DCA also stores data and provides a system for aggregating data to generate reports, either automatically or manually.

In one aspect, a system is provided. The system includes a processing unit and a memory storing computer executable instructions that, when executed by the processing unit, cause the system to perform actions. For instance, in response to the computer executable instructions, the system receives various input data, combines the input data with historical data, determines appropriate response stimuli to provide back to the devices that captured the input data, and then sends the chosen response stimuli to selected devices. Additionally, the system may associate input data with certain users and store the input data and selected response stimuli on local and/or remote databases to increase data processing efficiency of all devices involved with the system or to enable ad hoc operation when an internet connection is not available.

In another aspect, a method is provided. The method includes maintaining a searchable content repository associated with at least various types of input data, specific users, or groups of users. In one example, the searchable content repository may comprise one or more input data by a first user for a business meeting. In another example, the search content repository may comprise aggregated annotation data derived from annotation data by a plurality of users associated with a business meeting. In this way, a search interface may allow a user to search for content based upon input data and response stimuli (e.g., a search for portions of various meetings that made the majority of meeting participants happy) and/or single user input data and response stimuli (e.g., a search for portions of various meetings that made a user feel stressed). The method further allows the aggregation of input data and other variables to display in a visual interface, based on a user's search query.

In yet another aspect, a computer-readable storage medium is provided. The computer-readable storage medium stores computer executable instructions that, when executed by at least one processing unit, cause the at least one processing unit to receive various input data, process that input data, and utilize that input data to provide response stimuli. The response stimuli may be directed to an individual device or a group of devices. Furthermore, the computer executable instructions allow this stored, aggregated data to be shared with selected participants. Additionally, the computer executable instructions provide for participants to set one or more permissions on the aggregated data, wherein the one or more permissions limit access to the aggregated data.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
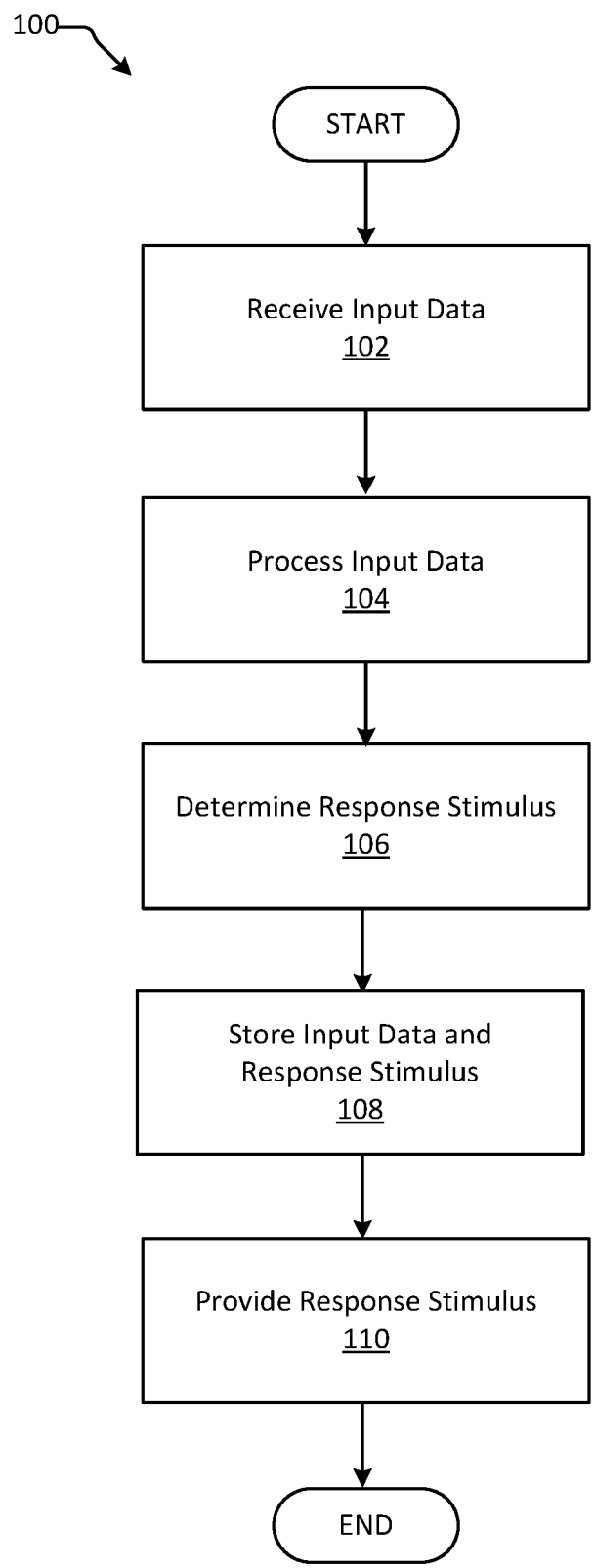
FIG. 1 is a flow chart illustrating an exemplary method for receiving, processing, and storing data and using that data to generate appropriate response stimuli.

In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

Aspects of the present disclosure relate to systems and methods for monitoring user emotional states and using an artificial-intelligence-based DCA to provide appropriate response stimuli based on the input data received. In one example, the user may request and/or opt-in for detection of user reactions to conversational content for various purposes, such as annotating the content of a business meeting based upon how the participants reacted to at least one portion of the business meeting. The DCA is a program that receives various types of input data, such as audio data (e.g., tone of voice), visual data (e.g., facial and body expressions), environment data (e.g., specific location), biometric data (e.g., heart rate), participant data (e.g., social media profiles), and solicited feedback from participants. For example, a device (e.g., a mobile phone, a laptop, a tablet device, vehicle instrumentation, a television, an electronic billboard, and/or other devices) may comprise one or more sensors, such as a camera, a motion sensor (e.g., an accelerometer or gyroscope), a GPS device, a microphone, and/or other sensors that may sense and obtain the input data. Various information, such as resource availability (e.g., battery life), metadata associated with a portion of a conversation (e.g., metadata identifying that the portion of conversational content may have a reaction probability of emotion above a threshold), a location context of the device (e.g., the user is at home vs. the user is at work), a context of the content (e.g., the user is reading the newspaper while at work), a current time, and/or other information may be used to selectively activate and deactivate one or more sensors associated with a device. For example, in a work meeting, particular sensors may be activated and deactivated, which may mitigate unnecessary resource consumption by sensors during certain portions of the work meeting that may not produce substantive input data. Such selective activation and deactivation of sensors during respective portions of a work meeting may allow for faster processing speeds on a device and conserve a device's battery life.

Every organization strives to increase productivity. Among other factors, an increase in productivity may result from, (1) an increase in work-task efficiency, and (2) improved team-member interactions. Many methods and devices have focused exclusively on work-task efficiency, neglecting to focus on the quality of team-member interactions. Among other benefits, the systems and methods disclosed herein may be utilized to increase the quality of team-member interactions. This quality of a team members' interactions may be measured by at least two important factors: (1) the level of equality in turn-taking during conversations and (2) the emotional responses/state of the participants. Today, there is no current capability to simultaneously monitor the emotional state of participants to a conversation and utilize artificial emotional intelligence to improve the emotional state of the participants, thereby improving the productivity of teams and organizations as a whole.

As described above, the present systems and methods provide for receiving and processing input data using artificial emotional intelligence that provides individualized and group response stimuli according to both input data and previously stored data. The input data received by the system may comprise user profiles, mobile device data, heart rate, galvanic skin response, audio data, visual data, participant actions, and historical patterns and context. The input data received may then be combined with stored historical data that may comprise data about a specific user, a specific group, or other contextual information about the meeting. Equipped with artificial emotional intelligence, the system uses the comparison data to then render appropriate response stimuli that may be generated for a specific individual, a specific group of two or more participants to a conversation, or the entire group. In further aspects, the historically stored data may be aggregated in specific ways to generate reports specific to an individual, a group of individuals, a set of emotional responses, or a meeting/conversation context. Additionally, these reports may be shared with users who may be provided varying degrees of access to the data and/or communications associated with the data. It is with respect to these and other general considerations that example aspects have been made.

FIG. 1 is a flow chart illustrating a method for receiving, processing, and storing data and using that data to generate appropriate response stimuli. Method 100 begins with a receive input data operation 102, where the input data may be automatically gathered via a personal mobile device, a personal computer (laptop or desktop), a shared electronic device like a conference call device, an online public profile, or other electronic devices that receive or store such input data. In aspects, a user or group of users may manually input data into the system in addition to allowing the system to automatically retrieve input data.

Once the receive input data operation 102 is completed, the method proceeds to process input data operation 104, where the input data may be converted from raw input data to machine-readable data. In aspects, the machine-readable data may be stored on a local database, a remote database, or a combination of both. For example, if the local storage capabilities of an electronic device are low, then a small portion of the machine-readable data may be stored on the device, and a larger portion may be stored on a remote storage location, such as a cloud server. The efficient storage and retrieval of large amounts of data is critical to ensuring productive conversations and meetings using the method 100. The raw input data may be converted into machine-readable data using a natural language understanding process (e.g., speech recognition). Generally, the central processing unit ("CPU") of the electronic device is equipped with a specific set of instructions as to how the raw input data should be analyzed. For example, a set of raw input data may be processed to remove outliers, instrument reading errors, and other data entry errors. In another example of processing raw input data into machine-readable data, a raw image may be analyzed for particular facial expressions. The processing structure of facial recognition generally begins with face detection (i.e., whether human faces appear in a given image and where such faces are located) and feature extraction (i.e., extracting human-face patches from raw images). Because each human patch may contain tens of thousands of pixels and may be shot from different camera alignments, the feature extraction step may overcome these drawbacks by implementing various solutions, such as information packing, dimension reduction (e.g., discrete Fourier transform, discrete cosine transform, eigenface, etc.), salience extraction, and noise cleaning. After the feature extraction step, a human-face patch is usually transformed into a vector with fixed dimensions or a set of fiducial points and their corresponding locations. Next, the human-face patch may be compared against a facial-expression database of a single user or several users. Each feature of the human-face patch is compared to stored face classes in a database. Finally, the results from the comparison may be verified and/or identified and subsequently presented to a user in a human-readable format that can be interpreted to provide meaningful information.

Upon converting the data to a machine-readable format, the method proceeds to determine response stimulus operation 106. In determine response stimulus operation, the received data may be analyzed according to one or more rules. For example, received may be combined with previously stored data based at least upon a predefined rule. More specifically, one or more rules may be used to determine an appropriate response stimulus based upon the received data. The comparison aspect of the determine response stimulus operation 106 may calculate the most appropriate response stimulus in light of the input data and previously stored historical data. For example, a raw image that is processed during the process input data operation 104 and compared with a database of a user's past facial expressions during the determine response stimulus operation 106 may indicate that the user is experiencing the emotion of boredom. In response to recognizing a particular emotional state, such as boredom, the determine response stimulus operation 106 may decide an appropriate response stimulus, such as encouraging a user to become more active in the discussion or encouraging other members to engage with the bored member. In other instances, the comparison step of the determine response stimulus operation 106 may involve comparing previously employed response stimuli. For example, a previously failed response stimulus, such as encouraging a user to respond to a colleague during a meeting in a way that made the user feel uncomfortable, may be considered during the comparison process. By including past response stimuli and their effects on a user in the comparison step, the response stimuli may be more effective and influential on the user.

At the store input data and response stimulus operation 108, the input data and determined response stimulus may be stored on a local storage medium, a remote storage medium or a combination of both. In aspects, the store input data and response stimulus operation 108 may occur in parts and may occur at earlier stages in the method. In one example aspect, the input data may be stored immediately after the process input data operation 104. In another example aspect, the chosen response stimulus may be saved immediately after the determine response stimulus operation 106. Additionally, the store input data and response stimulus operation 108 may occur simultaneously with the determine response stimulus operation 106 or the provide response stimulus operation 110.

At the provide response stimulus operation 110, the system may send the chosen response stimulus to a specific electronic device or group of electronic devices. The response stimulus may take the form of a textual message, a visual image or video, a haptic feedback (e.g., mobile device vibration), an audio output (e.g., playing uplifting music), or a combination of the aforementioned forms. In aspects, the same chosen response stimulus may be sent to two or more electronic devices. In other aspects, the chosen response stimulus may be individually tailored and sent to a single electronic device.

As noted above, the store input data and response stimulus operation 108 may occur before, after, or concurrently with the provide response stimulus operation 110. As should be appreciated, the various devices, components, etc., described with respect to FIG. 1 are not intended to limit the method 100 to being performed by the particular components described. Accordingly, additional topology configurations may be used to practice the methods and systems herein and/or components described may be excluded without departing from the methods and systems disclosed herein.

Figure 2:
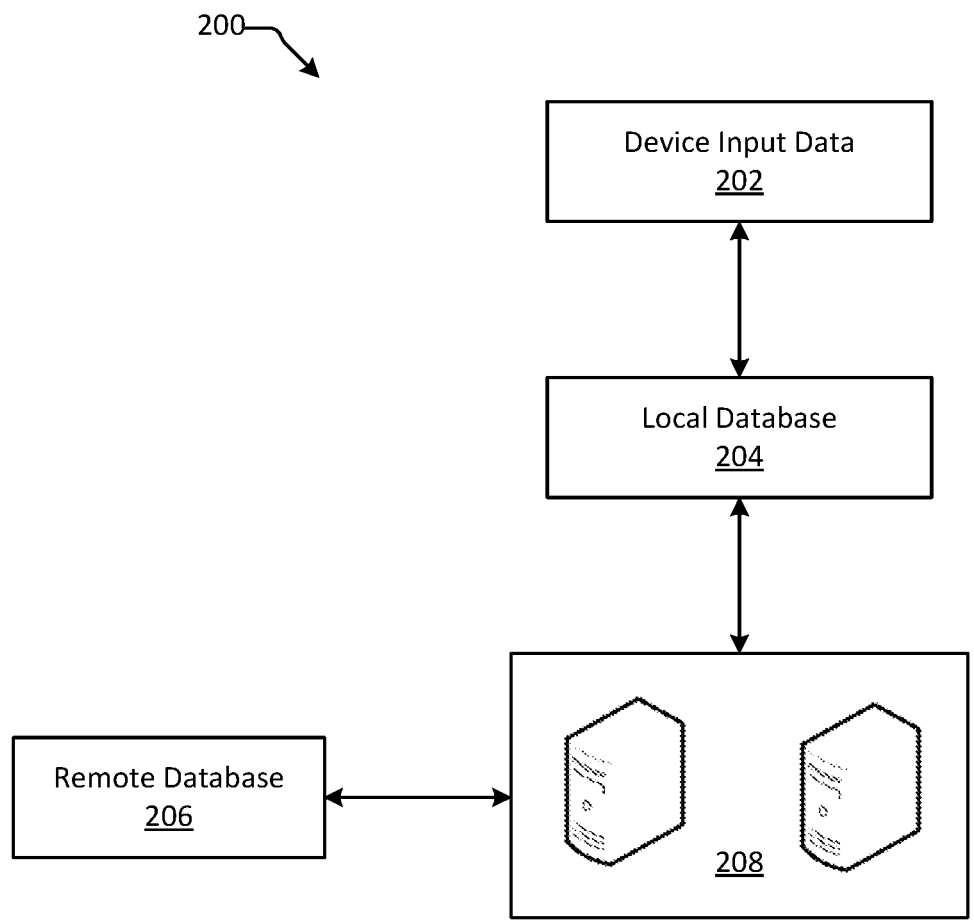
FIG. 2 illustrates an exemplary system for receiving and storing device input data on at least one local database, at least one remote database, or a combination of both.

FIG. 2 illustrates a system for receiving and storing device input data on at least one local database, at least one remote database, or a combination of both. As illustrated, system 200 may receive input data 202 from at least one local database 204 or from at least one remote database 206. Alternatively, system 200 may receive device input data 202 from a combination of at least one local database 204 and at least one remote database 206. System 200 may also store device input data 202 on at least one local database 204 or on at least one remote database 206. Alternatively, system 200 may store device input data 202 on a combination of at least one local database 204 and at least one remote database 206. System 200 may include a server computing devices 208, where data from at least one local database 204 and data from at least one remote database 206 are analyzed and processed.

The server computing devices 208 may receive the data from at least one local database 204 or at least one remote database 206 to determine an appropriate response stimulus. For example, if a user is having a conversation with a colleague at work, the server computing devices 208 may receive input data from at least one local database 204 housed on either the user's electronic device and/or the colleague's electronic device. Additionally, the server computing devices 208 may receive data simultaneously from at least one remote database 206 that contains previously stored metadata associated with past interactions between the user and the colleague in a work setting. Furthermore, the server computing devices 208 may receive the input data from at least one local database 204 in real-time during the conversation between the user and a colleague. In another example, the input data may be collected in real-time (e.g., by one or more sensors, such as a camera or microphone) on a local database 204, but at least some of this input data may be sent to the server computing devices 208 and processed at a different time (e.g., offline) for various reasons, such as resource utilization. If an electronic device is low on battery power, transmitting input data from a local database 204 to server computing devices 208 may constitute an undesirable use of resources, especially if the electronic device powers off during the transmission. Thus, at least some portions of input data that are gathered in real-time during a conversation may be sent to the server computing devices 208 and processed at a later time. Once the server computing devices 208 receive the input data and execute method 100, the server computing devices 208 may then provide a response stimulus to at least one electronic device associated with the device input data 202. In other aspects and with regard to resource utilization (e.g., battery power), the response stimuli provided by the server computing devices 208 may be stored on at least one local database 204, at least one remote database 206, or a combination of both. System 200 may manage the allocation of the device input data 202 and response stimuli with the purpose of allocating the data most efficiently to improve overall computational performance. As should be appreciated, the various devices, components, etc., described with respect to FIG. 2 are not intended to limit the systems and methods to the particular components described. Accordingly, additional topology configurations may be used to practice the methods and systems herein and/or components described may be excluded without departing from the methods and systems disclosed herein.

Figure 3:
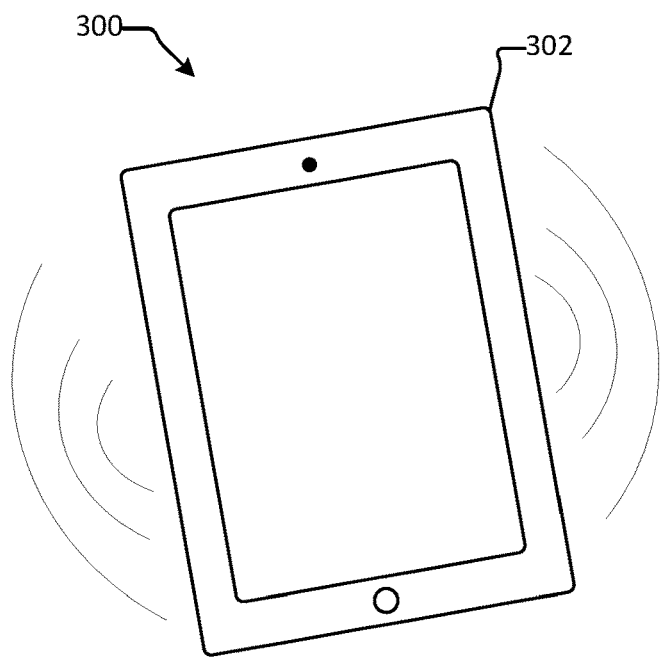
FIG. 3 illustrates example mobile devices receiving input data associated with at least one of the movements of a mobile device, the audio data received by the mobile device, and the visual data received by the mobile device.
Figure 3:
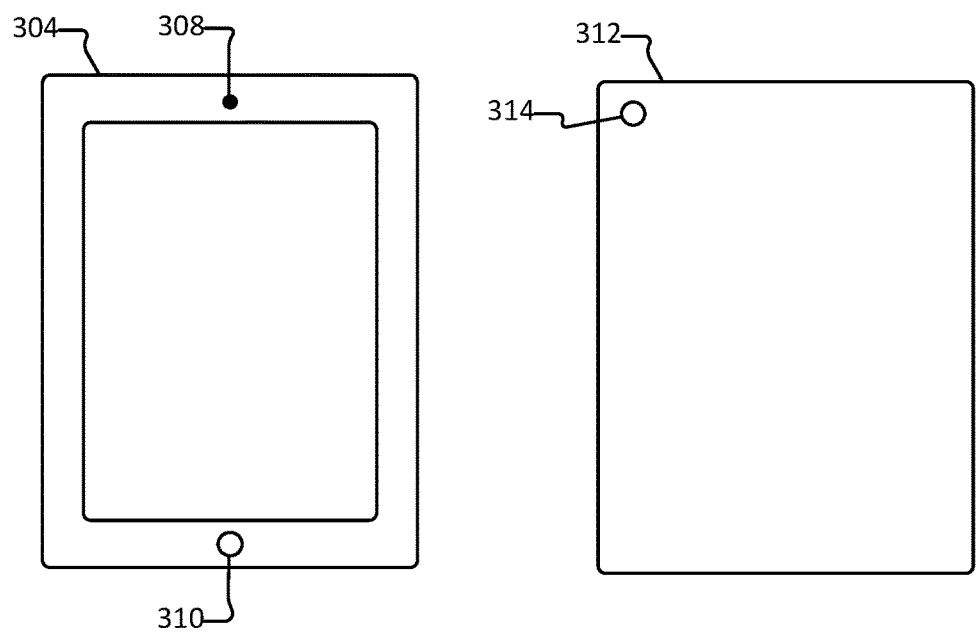

FIG. 3 illustrates example mobile devices receiving input data associated with at least one of the movements of a mobile device, the audio data received by the mobile device, and the visual data received by the mobile device. In the first system illustrated by device 302, the input data that is received may be associated with the movement of the device. For example, this movement of device 302 may be caused by shaking the device 302 or slamming the device 302 onto a table or other hard surface. Such forceful movements of the device 302 may be detected by device 302 (e.g., by an accelerometer or other hardware component) and communicated to and processed by a method, such as the method 100, as described in FIG. 1, to determine the current emotional state of the user and the appropriate response stimulus to provide to that user. In example aspects, the forceful movements of the device 302 may be associated with emotions like frustration, anger, and annoyance. In one example aspect, a user may be having a conversation with a work colleague, and the input data obtained from the conversation indicates that there is a relatively high reaction probability that the user may have a negative reaction (e.g., angry emotion). If a user subsequently throws his electronic device 302 on a desk or abruptly moves it, this physical movement may be analyzed in the context of the previously determined high negative reaction probability. In example aspects, predetermined thresholds for individual users regarding the abrupt movements of the electronic device 302 may be utilized to determine a user's emotional state. Such thresholds may also be altered in light of other input data (e.g., geolocation, conversation topic, participants to a conversation, etc.). For example, if a user is talking to a close friend, and the input data indicates that they are engaging in a jovial conversation, an abrupt movement of the electronic device 302 (e.g., playfully tossing a mobile phone in the air and catching it) may not indicate a negative reaction. In a jovial context, the threshold for triggering a negative reaction determination may be different than the threshold in an argumentative context. Alternatively, some forceful movements of the device 302 may be associated with inadvertently dropping the device 302. Other forceful movements of the device 302 may be associated with rapid walking or jogging movements. A method such as the method 100, as described in FIG. 1, may be able to distinguish among these forceful movements using artificial emotional intelligence algorithms supplemented with historical data.

As illustrated, device 304 depicts the front view of an electronic device and device 312 depicts the back view of the same electronic device. Devices 304 and 312 may include a built-in front-facing camera 308, a built-in back-facing camera 314, and a built-in microphone 310. The front-facing camera 308 and back-facing camera 314 may receive visual input data, including facial expressions and body expressions of the individual using the devices 304 and 312 and other individuals who may be in physical proximity to the individual using devices 304 and 312. Additionally, the front-facing camera 308 and back-facing camera 314 may receive visual input data concerning the surrounding environment or context. The system 100, as described in FIG. 1, may have the ability to analyze the environment data received from the front-facing camera 308 or back-facing camera 314 on devices 304 or 312 to determine if devices 304 or 312 are in certain settings, such as a boardroom, a senior-level manager's office, a lobby area, a public park, a restaurant, a church service, etc.

Additionally, the method 100, as described in FIG. 1, may have the ability to determine if devices 304 or 312 are in an educational setting, such as a classroom, by comparing input data (e.g., retrieved from input data sources, such as a camera and/or microphone) with predetermined data that indicates an educational setting. For example, the predetermined data may comprise a GPS location of a school, images of classroom settings with rows of desks and a chalkboard and/or whiteboard, voice intonations of children in a certain age demographic, and user-provided data indicating that the devices 304 or 312 are in an educational setting. In one such example from the perspective of a teacher, the front-facing camera 308 of device 304 may receive the visual input data of the teacher at the front of a classroom. The back-facing camera 314 of device 312 may receive the visual input data of the students in the back of the classroom. It should be noted that the functionalities of these cameras 308 and 314 may be reversed. The microphone 310 of device 304 may receive the audio input of both the teacher and the students. Additionally, from the perspective of a student in a classroom, the front-facing camera 308 of device 304 may receive the visual input data of that student and perhaps individuals sitting behind the student using device 304. The back-facing camera 314 of device 312 may receive the visual input data of the teacher at the front of the classroom and individuals sitting in front of the student using device 312. The microphone 310 may be used to receive audio input data of the students and teacher in the classroom. In an example aspect where the teacher is using a device and a group of students are each using a device, the input data that is collected from the teacher's device and the students' devices may be analyzed and processed together to provide the appropriate response stimuli to each participant in the classroom, according to system 100, as described in FIG. 1. The teacher's device may receive and display or otherwise communicate an individual response stimulus about the current emotional state of a student or students. A group of student devices may receive a response stimulus concerning participation levels in class, or a single student device may receive an individualized response stimulus encouraging that student to allow others to voice their opinions. Reactions to the response stimuli will also be captured by the devices 302, 304, and 312 and subsequently processed and combined or compared according to system 100, as described in FIG. 1.

In some aspects, the mobile devices 302, 304, and 312 may have the ability to receive biometric data, such as heart rate, heart rate variability, and galvanic skin response. In other aspects, the mobile devices 302, 304, and 312 may be associated with an external wearable device, such as a heart rate monitor or a smart watch. The input data received from these external devices may also be captured and processed by system 100, as described in FIG. 1.

In another example aspect, the input data received from mobile devices 302, 304, and 312 may be received in a similar method by a tablet device that is also equipped with a similar front-facing camera 308, back-facing camera 314, and microphone 310. Additionally, audio input data may be received from other devices, such as a headset that may be linked to a mobile or tablet device. This same audio input data may be processed and analyzed by system 100, as described in FIG. 1.

As should be appreciated, the various devices, components, etc., described with respect to FIG. 3 are not intended to limit the systems and methods to the particular components described. Accordingly, additional topology configurations may be used to practice the methods and systems herein and/or components described may be excluded without departing from the methods and systems disclosed herein.

Figure 4:
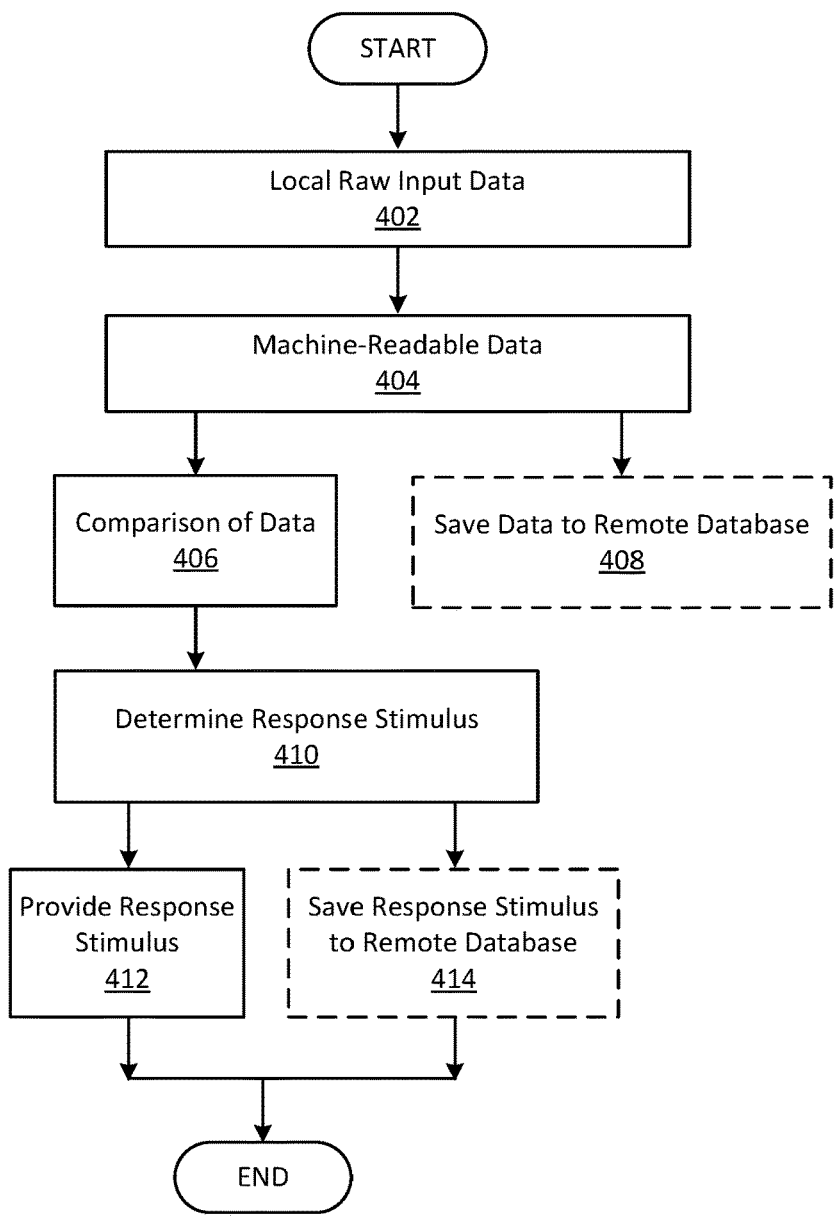
FIG. 4 illustrates an exemplary method for processing input data using.

FIG. 4 is a flow chart illustrating a method for processing input data. Method 400 begins with the receive local raw input data operation 402 and convert local raw input data into machine-readable data operation 404. For example, the conversion operation 404 may be equipped with a certain set of instructions regarding facial recognition. The set of instructions may analyze an input image's binary data for the relative position, size, and/or shape of the eyes, nose, cheekbones, and jaw. The binary input data may then be converted to machine-readable data that reflects a human face. Once the conversion process is complete, the machine-readable may then be sent to the comparison of data operation 406, where the newly acquired machine-readable data is combined or compared with previously stored historical data. For example, machine-readable data that indicates a facial expression may be compared with previously stored images of a single user's facial expressions or a group of users' facial expressions to detect a match. In another example, machine-readable data that may indicate a cheerful conversation between two friends may be compared with previous interaction between those two friends. Once the comparison of data operation 406 is complete, the results of the comparison of data operation 406 are then used to determine the response stimulus operation 410. Various information, such as resource availability (e.g., battery life), metadata associated with a portion of a conversation (e.g., metadata identifying that portion of a conversation may have a reaction probability of emotion above a threshold), a location context of the electronic device (e.g., the user is at home vs. in a work meeting), a context of the conversation (e.g., the user is speaking to a supervising manager), a current time, and/or other information may be used to determine the type of response stimulus to provide to the user. In the example of the two friends having a cheerful conversation, an appropriate response stimulus may be to encourage the first friend to tell a particular type of joke that the second friend has previously found to be amusing. In another example of the two friends having a conversation, the first friend may suffer from depression, and the second friend may be attempting to console the first friend. The input data received in real-time from the conversation may indicate that the first person is sad and depressed. By comparing this input data with previously stored data regarding the first friend and the interactions between the first friend and the second friend, an appropriate response stimulus may be generated (e.g., encourage the second friend to say something like "You are important to me" rather than something like "No one ever said that life was fair"). As such, various rules may be employed to analyze the data and signals received from one or more devices related to the conversation in order to determine a response stimulus.

In an example aspect of the determine response stimulus operation 410, the determination of which response stimulus to provide to the user or users may be formulated with the assistance of artificial emotional intelligence ("AEI") algorithms. In one example, a series of problems and experiences with corresponding solutions may be pre-programmed. When a user is faced with a similar problem that is pre-programmed in the AEI algorithm, the algorithm may employ case-based reasoning to compare the two problems and produce a solution that is similar to the pre-programmed solution. In another example, the AEI algorithm may use statistical classification by identifying to which set of categories or sub-populations a new observation (e.g., input data) belongs. Such categories and/or sub-populations may include home vs. work, friends vs. work colleagues, one-on-one meetings vs. group meetings, educational lectures vs. recreational settings, etc. Similarly, the AEI algorithms may employ cluster analysis to group sets of objects in such a way that objects in the same group (a cluster) are more similar to each other than to those in other groups (clusters). In one example, clusters may be created according to geographic location. In another example, clusters may be created according to time (e.g., exercise in the morning, eat dinner at night). These clusters may be used by the AEI algorithms to help determine the most appropriate and effective response stimuli for users.

Once the determine response stimulus operation 410 is complete, the system 400 then provides the response stimulus 412 to the user or users. In one example aspect of system 400, after the response stimulus is determined in operation 410, the response stimulus may be saved to a remote database 414. Alternatively, the response stimulus may be saved to a local database or allocated across a combination of at least one local database and at least one remote database.

As should be appreciated, the various devices, components, etc., described with respect to FIG. 4 are not intended to limit the systems and methods to the particular components described. Accordingly, additional topology configurations may be used to practice the methods and systems herein and/or components described may be excluded without departing from the methods and systems disclosed herein.

Figure 5:
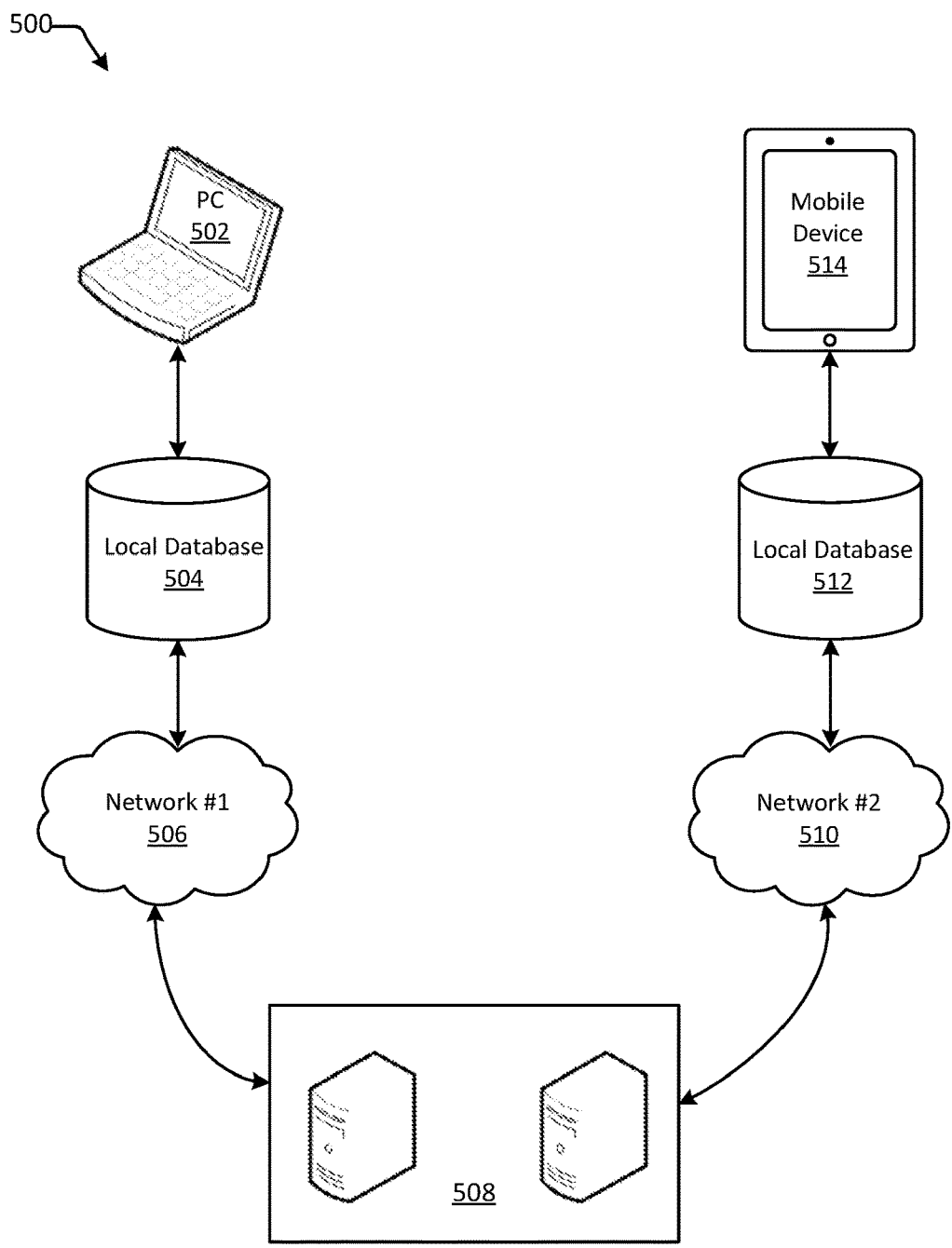
FIG. 5 illustrates an exemplary system for receiving input data from at least one of two electronic devices connected to at least one of two networks to generate at least one response stimulus.

FIG. 5 illustrates a system for receiving input data from at least one of two electronic devices connected to at least one of two networks to generate at least one response stimulus. As illustrated, system 500 depicts an example of a conversation between at least two different electronic devices, namely a personal computer 502 and mobile device 514, that are physically remote and that are connected to at least two different networks (e.g., network #1 506 and network #2 510). Although devices 502 and 514 may be connected to different networks 506 and 510, they are still accessing the same server computing devices 508 that, e.g., perform method 100, as described in FIG. 1. When devices 502 and 514 receive input data via the methods described in FIG. 4, the input data may be stored on local databases 504 and 512, and then, the input data stored on the local databases is transmitted over at least one network 506 or 510 to the server computing devices 508. The server computing devices 508 may then execute method 100 by processing the input data in operation 104, determine the response stimulus in 106, store the input data and response stimulus in operation 108, and finally provide the response stimulus back to the user in operation 110. Additionally, as previously described in FIG. 2, the input data may be collected in real-time (e.g., by one or more sensors, such as a camera or microphone) on at least one local database 504 or 512, but at least some of this input data may be sent to the server computing devices 208 and processed at a different time (e.g., offline) for various reasons, such as resource utilization. If a mobile device 514 is low on battery power, transmitting input data from a local database 512 to server computing devices 508 may constitute an undesirable use of resources, especially if the electronic device powers off during the transmission. Thus, at least some portions of input data that are gathered in real-time during a conversation may be sent to the server computing devices 508 and processed at a later time. Once the server computing devices 508 receive the input data and execute method 100, the server computing devices 508 may then provide a response stimulus to at least one of the electronic devices 502 and 514 associated with the device input data.

In one example aspect, devices 502 and 514 may be the same type of device. For instance, devices 502 and 514 both may be either mobile phones or personal computers. In another aspect, as described in FIG. 5, the devices 502 and 514 may be different (e.g., a personal computer 502 and mobile device 514). Similarly, devices 502 and 514 both may be connected to the same network. For instance, a large convention center may have a single network in which multiple devices located around the center connect to that one network. In another instance, the devices may be in the same conference room and connected to the same network. Alternatively, as described in FIG. 5, devices 502 and 514 may be connected to different networks, network #1 506 and network #2 510. For instance, personal computer 502 may be communicating to a mobile device 514 located in a different country. Notwithstanding the physical remoteness of the devices 502 and 514, the server computing devices 508, may be able to receive and process input data according to, e.g., method 100 in FIG. 1, from across multiple networks, such as network #1 506 and network #2 510.

As should be appreciated, the various devices, components, etc., described with respect to FIG. 5 are not intended to limit the systems and methods to the particular components described. Accordingly, additional topology configurations may be used to practice the methods and systems herein and/or components described may be excluded without departing from the methods and systems disclosed herein.

Figure 6:
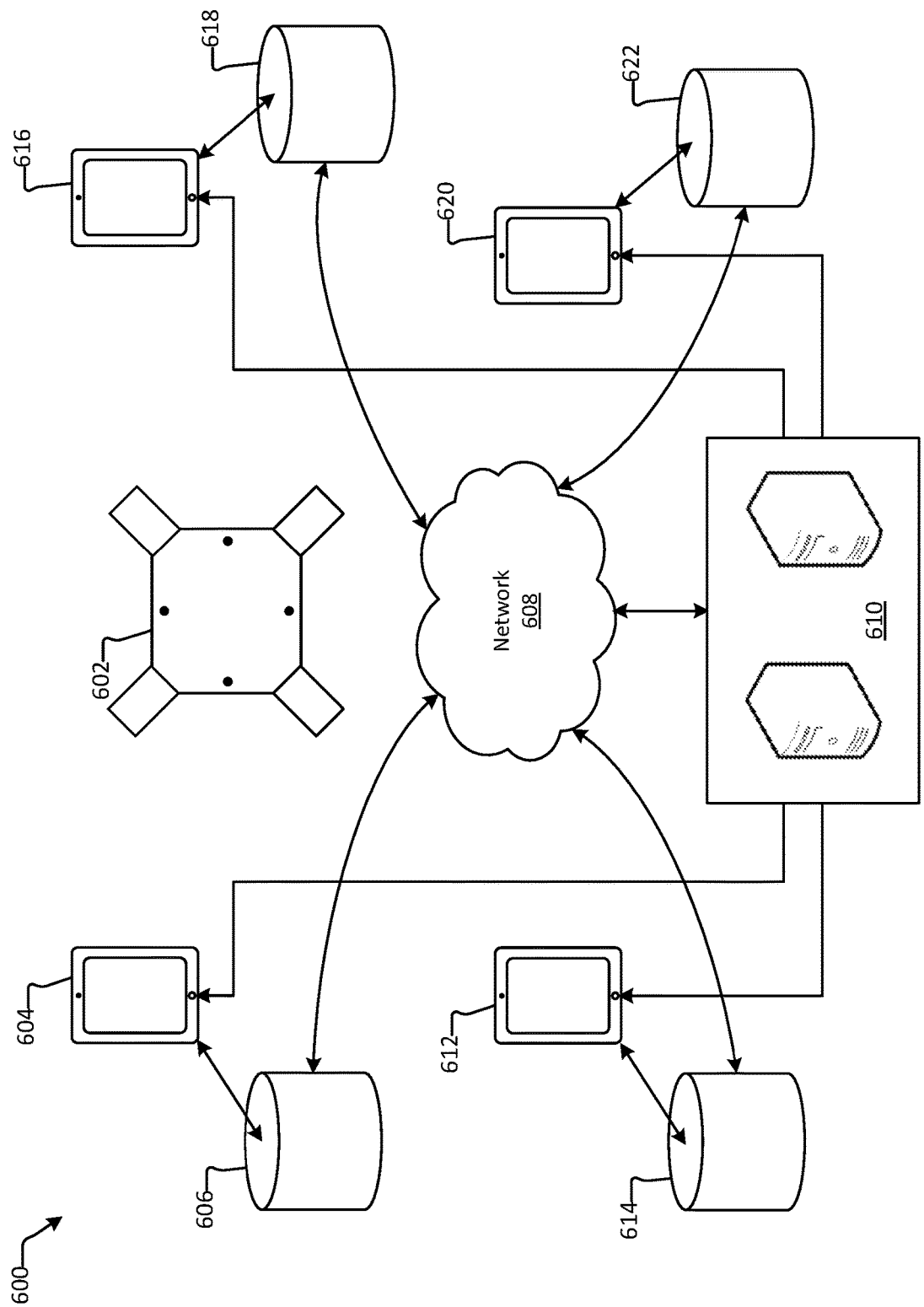
FIG. 6 illustrates an exemplary system for receiving input data from at least one of personal electronic devices and conference call devices connected to the same network to generate at least one response stimulus.

FIG. 6 illustrates a system for receiving input data from at least one of personal electronic devices and conference call devices connected to one or more networks to generate at least one response stimulus. As illustrated, system 600 may depict an example of a team conversation or a group meeting occurring in a boardroom or shared meeting space. In this example aspect, multiple devices are accessing the server computing device(s) 610 that are running implementing the present methods, such as method 100, as described in FIG. 1. The input data received from the devices 602, 604, 612, 616, and 620 may be stored initially on local databases 606, 614, 618, and 622. The input data stored on the local databases 606, 614, 618, and 622 may also be transmitted via one or more networks 608 to the server computing devices 610.

In one example aspect, the meeting may utilize personal mobile devices 604, 612, 616, and 620 that are connected to a network 608. For instance, if the meeting is among participants who are all physically in the same location, then using the conference call device 602 may be unnecessary. Alternatively, if a part of the group is physically proximate, but at least one other participant is physically remote, then system 600 may utilize at least one of the mobile devices 604, 612, 616, and 620 in conjunction with the conference call device 602.

In another example aspect, fewer or more than four mobile devices may be accessing the server computing devices 610. For instance, if a group of participants are in a boardroom for a meeting, each participant may be utilizing a mobile device, like devices 604, 612, 616, or 620. In another instance, the same group of participants in the boardroom may not have any mobile devices and instead, utilize the conference call device 602. The group of participants may also elect to use multiple conference call devices 602 connected to one or more networks 608.

System 600 may be implemented on a single network 608, as depicted in FIG. 6, or across multiple networks. Instead of all mobile devices 604, 612, 616, and 620 connected to the same network 608, at least one or more mobile devices 604, 612, 616, and 620 may be connected to different networks (i.e., one device may access the Internet via a Wi-Fi network, whereas another device may access the Internet via a mobile data connection). Such an example aspect may provide for a more efficient flow of data and response stimuli among devices and databases. Additionally, a more efficient flow of data and response stimuli may increase battery life in electronic devices, as meetings and conversations may be more efficient and productive.

System 600 may be applied to a team setting, where each participant may have a different role in the team. In another example application, system 600 may be associated with a classroom setting, where each student in the classroom may have one or more mobile devices 604, 612, 616, and 620 connected to the server computing device(s) 610 via one or more networks 608. Additionally, a teacher may possess a mobile device that is connected to the server computing device(s) 610 via network 608. As described in FIG. 3, the mobile devices may receive input data that is then sent via network 608 to the server computing devices 610 running system 100, as described in FIG. 1. The input data from the students, teacher, and classroom environment may be received, processed, and combined or compared on the server computing device(s) 610 using method 100 described with respect to FIG. 1. Response stimuli may be generated from the input data that may be tailored to a group of participants in the classroom or to individual participants in the classroom, such as the teacher or a student who may be lacking in participation. For example, as previously described in FIG. 4, artificial emotional intelligence algorithms that are used to determine the appropriate response stimuli may use statistical classification or cluster analysis to identify which set of categories or sub-populations a particular group of participants belongs. For example, the cluster of students who may be lacking in participation may receive a tailored response stimulus (e.g., specific encouragement to raise their hands and participate in the discussion) that is different from a general class response stimulus (e.g., if the classroom is too noisy, a general response stimulus encouraging the class to quiet down may be provided). In another example, after the input data is combined or compared with previously stored data in operation 406, a teacher may receive an individual response stimulus suggesting a certain teaching method to keep the attention of the students. Specifically, a past response stimulus (e.g., suggested teaching method) may have been inefficient, so the determine response stimulus operation 410 may take that into account when determining the most appropriate and effective response stimulus to provide to the teacher.

As should be appreciated, the various devices, components, etc., described with respect to FIG. 6 are not intended to limit the systems and methods to the particular components described. Accordingly, additional topology configurations may be used to practice the methods and systems herein and/or components described may be excluded without departing from the methods and systems disclosed herein.

Figure 7:
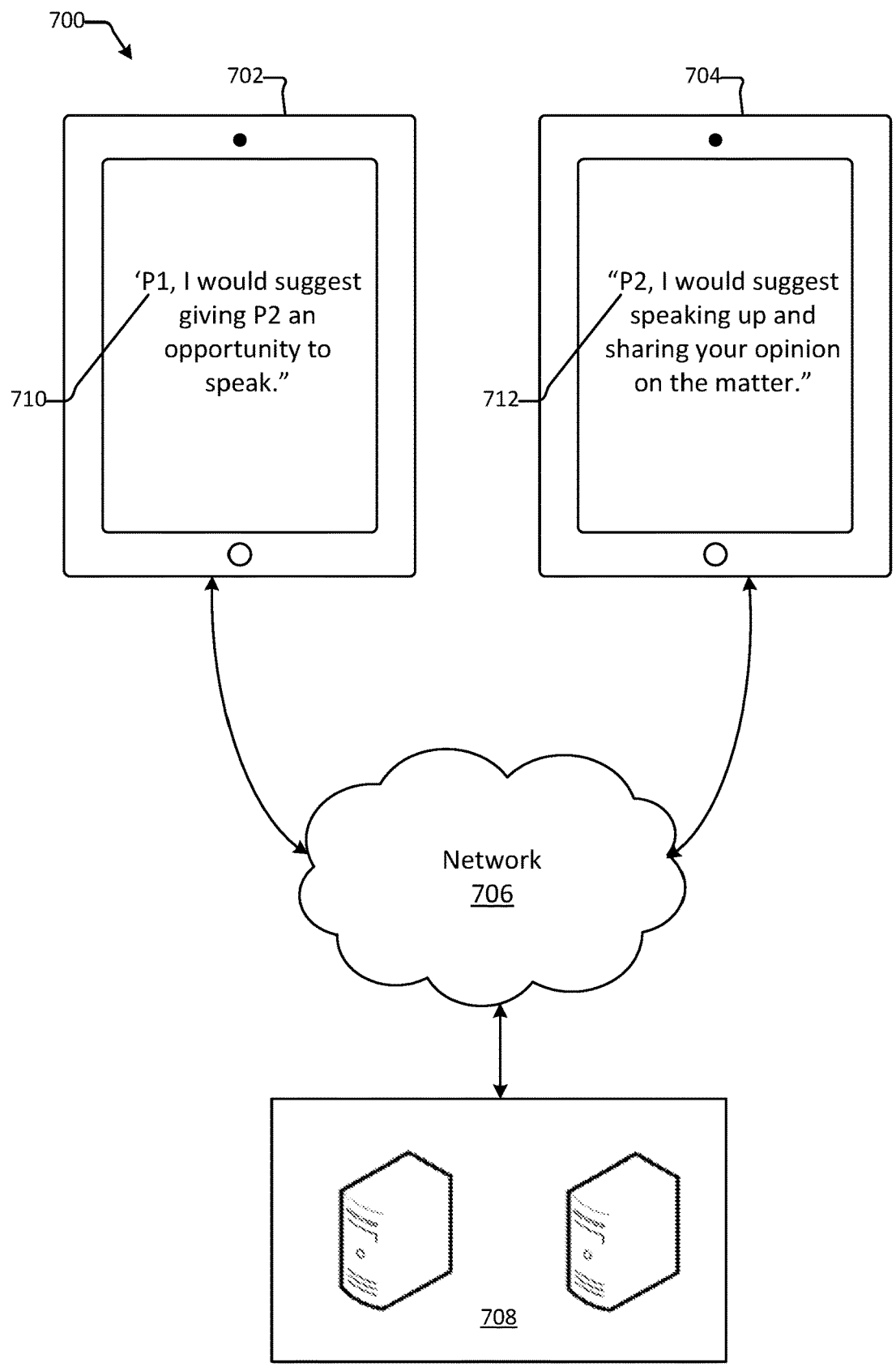
FIG. 7 illustrates an example for providing various private response stimuli to at least two electronic devices connected to the same network.

FIG. 7 illustrates an example for providing various private response stimuli to at least two electronic devices. As illustrated, the example 700 depicts at least two separate electronic devices 702 and 704 each receiving a private response stimulus from the server computing device(s) 708. In this example system 700, the server computing device(s) 708 are implementing method 100, as described in FIG. 1, and receiving input data and sending response stimuli via network 706. In one example aspect, as depicted in FIG. 7, a participant P1 may be talking too much during a meeting or conversation. The device 702 may receive this input data, e.g., by the methods described in relation to the systems of FIG. 3. The input data may be sent to the server computing device(s). The input data may be processed by the operations described in FIG. 1 on the server computing device(s) 708. A private response stimulus 710 may be determined in light of the input data and sent back to P1's electronic device 702 (but not to electronic device 704). In the example aspect depicted in FIG. 7, this response stimulus 710 consists of a suggestion to give another participant P2 an opportunity to speak because P1 may be talking too much. The response stimulus 710 may be a private response stimulus that may not be viewed by another participant (e.g., participant P2) to the conversation.

Simultaneously, as described in FIG. 7, participant P2 may not be contributing to the meeting or conversation very much. P2's device 704 may be receiving such input data by the methods described in relation to the systems of FIG. 3. The input data may be sent to the server computing devices 708. The input data may be processed by the operations described in FIG. 1 on the server computing devices 708. A response stimulus 712 may be determined in light of the input data and sent back to P2's electronic device 704. In the example aspect depicted in FIG. 7, this response stimulus 712 consists of a suggestion to speak up because P1 may be dominating the conversation, and P2 may not be contributing enough. The response stimulus 712 may be a private response stimulus that may not be viewed by another participant to the conversation.

The example scenario depicted in FIG. 7 may be performed when devices 702 and 704 are different devices. For instance, device 702 may be a personal computer, and device 704 may be a smart watch. Furthermore, the example scenario depicted in FIG. 7 may be performed across more than one network. Device 702 may be connected to a different network than device 704. However, both devices may still be accessing the server computing devices 708 that execute system 100, as described in FIG. 1.

In another example aspect, the response stimuli 710 and 712 may comprise visual images and videos, uplifting quotes, funny jokes, textual messages (as depicted in FIG. 7) or a combination of the aforementioned response stimuli. Additionally, the response stimuli 710 and 712 that are provided to the devices 702 and 704 may be different according to the input data received and the previously stored historical data. As depicted in FIG. 7, a response stimulus 712 may be appropriate for a user who demonstrates a lack of participation. Additionally, different response stimuli may be provided to various user electronic devices when the input data may indicate emotions of anger, boredom, happiness, etc.

As should be appreciated, the various devices, components, etc., described with respect to FIG. 7 are not intended to limit the systems and methods to the particular components described. Accordingly, additional topology configurations may be used to practice the methods and systems herein and/or components described may be excluded without departing from the methods and systems disclosed herein.

Figure 8:
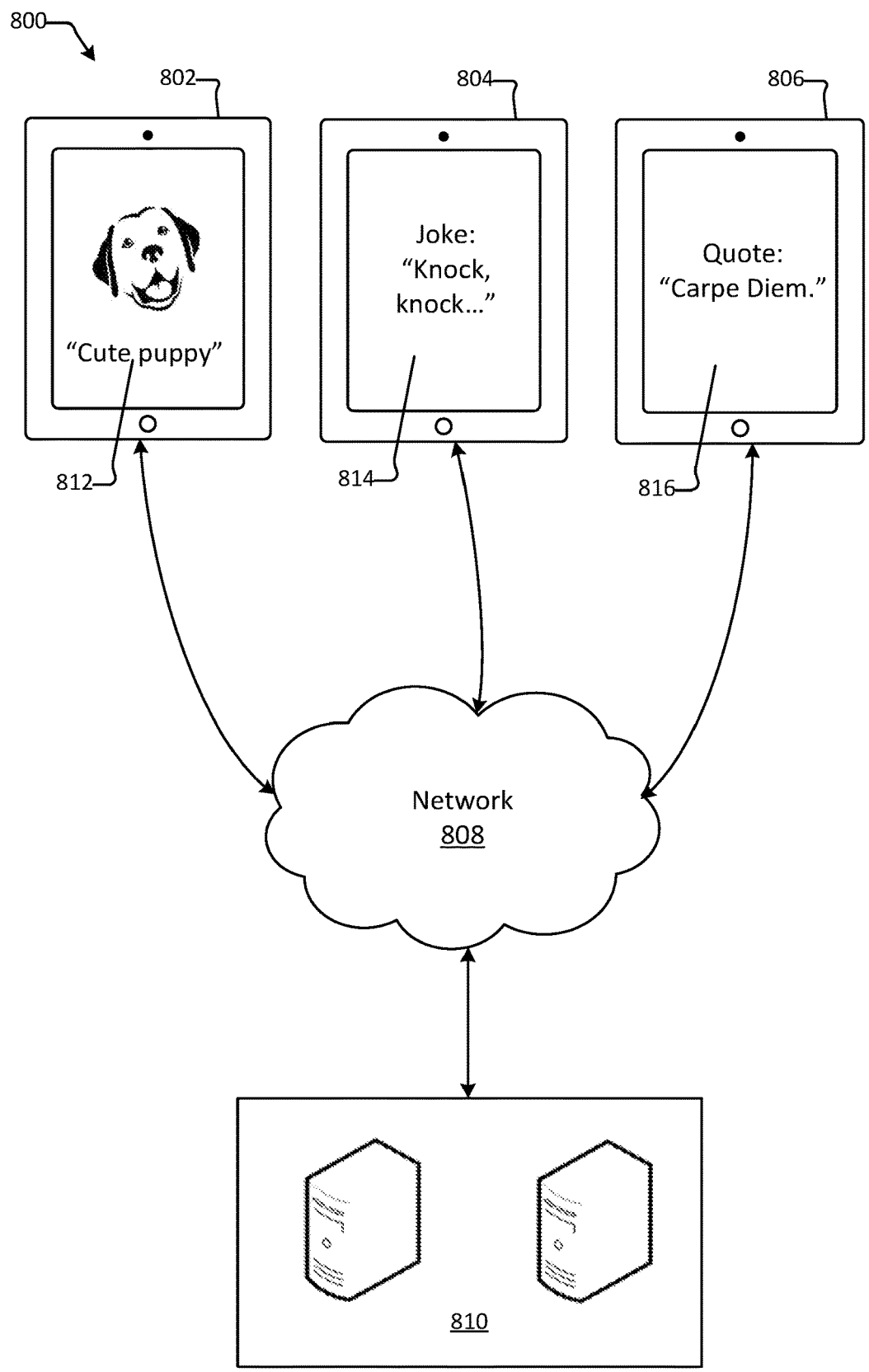
FIG. 8 illustrates an example for providing various public response stimuli to at least two electronic devices connected to the same network.

FIG. 8 illustrates an example for providing various public response stimuli to at least two electronic devices connected to the same network. As illustrated, FIG. 8 depicts three electronic devices 802, 804, and 806 connected to a shared network 808 that communicates with the server computing device(s) 810, which may be performing method 100, as described in FIG. 1. In one instance, system 800 may be used in a group or team setting, when the input data received from at least the electronic devices 802, 804, and 806 indicate an overall negative emotional state. A negative emotional state may be identified through comparison of input data received by one of the various sensors associated with a user's electronic device (e.g., camera, microphone, GPS location, accelerometer, etc.) with previously stored data associated with a particular user's or a group of users' negative emotional states. One or more rules may be analyzed during the comparison in order to identify a negative emotional state. In the instance that the method 100 being performed on the server computing device(s) 810 detects a negative emotional state, the server computing device(s) 810 may determine that all participant devices 802, 804, and 806 need to receive a positive response stimulus. For example, device 802 may receive a positive response stimulus depicting a cute puppy 812. Device 804 may receive a positive response stimulus in the form of a knock-knock joke 814. Device 806 may receive a positive response stimulus in the form of an uplifting quote 816. Other positive response stimuli may include uplifting music or a combination of the aforementioned positive response stimuli.

The example scenario depicted in FIG. 8 may be performed when devices 802, 804, and 806 are different devices. For instance, device 802 may be a personal computer, device 804 may be a conference call device, and device 806 may be a tablet device. Furthermore, the example scenario depicted in FIG. 8 may be performed across more than one network. Devices 802 and 804 may be connected to a different network than device 806. However, both devices may still be accessing the server computing devices 810 that execute system 100, as described in FIG. 1.

The response stimuli depicted in FIG. 8 may not be limited to merely positive uplifting response stimuli, but may include haptic feedback response stimuli. For example, if system 100, as described in FIG. 1, detects that a participant's emotional state is boredom, the appropriate response stimulus may be haptic feedback in the form of vibration. Specifically, a device 802 may receive a short, intermittent vibration. Additionally, in a conference or classroom setting, students may collectively receive response stimuli in the form of haptic feedback (i.e., if a group of students in a classroom are bored, they may receive a short vibration on their electronic device).

As should be appreciated, the various devices, components, etc., described with respect to FIG. 8 are not intended to limit the systems and methods to the particular components described. Accordingly, additional topology configurations may be used to practice the methods and systems herein and/or components described may be excluded without departing from the methods and systems disclosed herein.

Figure 9:
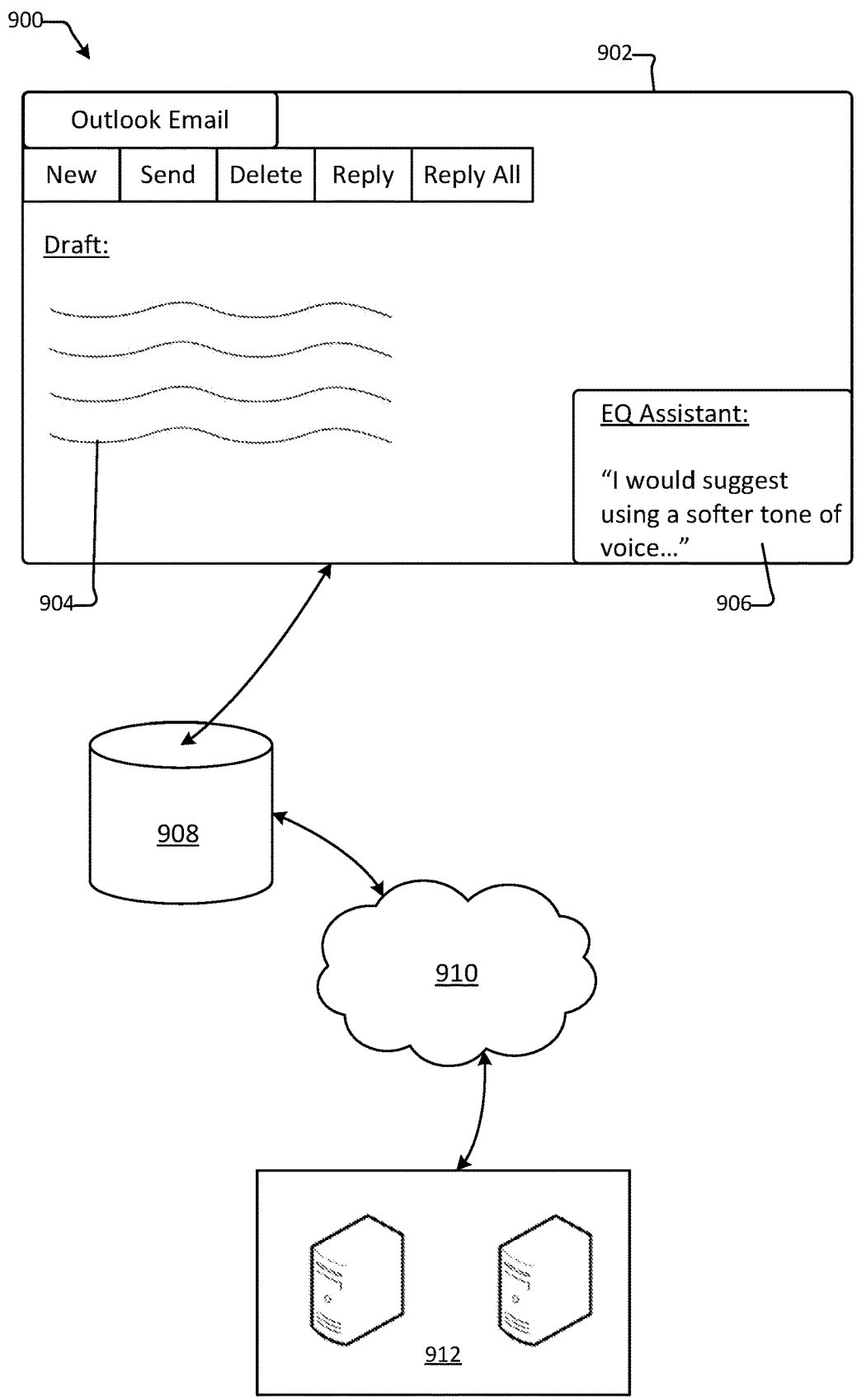
FIG. 9 illustrates an exemplary method for providing at least one response stimulus associated with textual data in an email application.

FIG. 9 illustrates a system for providing at least one response stimulus associated with textual data in an email application. As illustrated, system 900 depicts a user interface of an email application that is displayed on a client device 902 and a response stimulus 906. The text 904 may be first saved to a local database 908. The system 100, as described in FIG. 1, may receive the email draft text 904 (stored on the local database 908) as input data, process the text 904 according to the methods described in FIG. 4, and provide a response stimulus 906. As depicted in FIG. 9, the server computing device(s) 912, which may be executing method 100, may receive the draft text 904 and determine using textual analysis and linguistic forensics that the word choice or tone of voice is inappropriate. As a result, the server computing devices 912 running system 100 will provide an appropriate response stimulus 906 to the email application 902, encouraging the user of the email application to use a softer tone of voice.

In other example aspects, the email application 902 may be executed on various devices, including mobile devices, tablets, and personal computers. Additionally, the method 900 may be performed in the context of a text messaging application, such as iMessage, WeChat, Facebook Messenger, WhatsApp, etc.

Additionally, system 100 running on the server computing devices 912 may have the capability of detecting whom the intended recipient of the message may be, receiving input data from the intended recipient during the same time as the draft text 904 is being composed, and using that input data to generate more specific response stimuli to the drafter of the potential email. For example, if participant P1 is drafting an email to send to participant P2, the system 100 may detect that P1 intends to send an email to P2. The system 100 may receive input data from both P1 and P2 to generate the most accurate and appropriate response stimuli. For instance, if P1 is upset with P2, but P2 is currently sad, the system 100 may be able to detect these emotions simultaneously and provide an appropriate response stimulus to P1 (e.g., "I would suggest using a softer tone of voice because P2 is sad.").

As should be appreciated, the various devices, components, etc., described with respect to FIG. 9 are not intended to limit the systems and methods to the particular components described. Accordingly, additional topology configurations may be used to practice the methods and systems herein and/or components described may be excluded without departing from the methods and systems disclosed herein.

Figure 10:
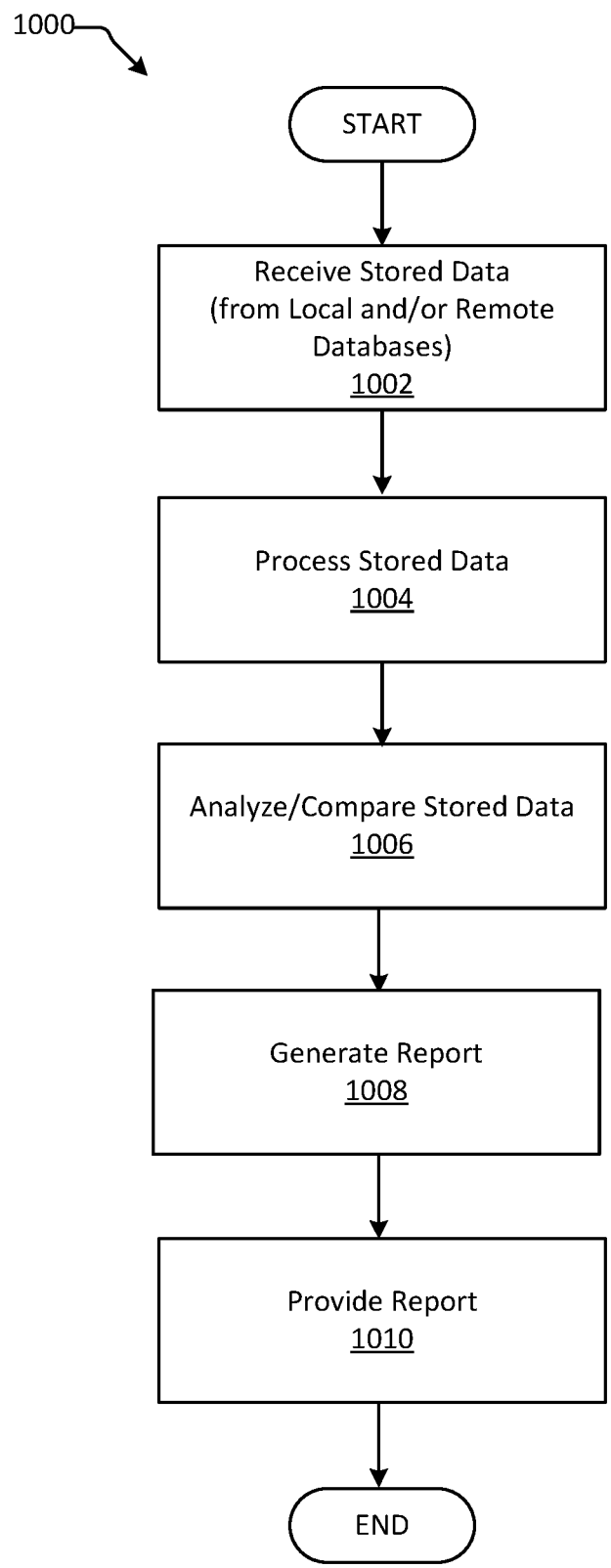
FIG. 10 is a flow chart illustrating an exemplary system for aggregating data and generating customized reports associated with at least one of input data and response stimuli data.

FIG. 10 is a flow chart illustrating a method for aggregating data and generating customized reports associated with at least one of input data and response stimuli data. For example, during a stressful day at work, a user may search through a search interface for content that invoked happiness (e.g., a cute puppy 812, a knock-knock joke 814, an uplifting quote 816, etc.). A user may be able to submit a single user reaction search (e.g., search images that made the user laugh) and/or submit a general user reaction search (e.g., search videos that made multiple users sad). As illustrated, method 1000 begins with the received stored data operation 1002. Method 1000 retrieves previously stored data from at least one of local databases and remote databases. This previously stored data may comprise input data from a single user and/or a plurality of users associated with a certain context (e.g., GPS location, work meeting, recreational activity, educational setting, etc.). The previously stored data may also comprise determined response stimuli that were generated in response to the various input data received and the comparisons subsequently conducted on the input data. The received stored data is then processed 1004 and analyzed 1006 according to specific sets of organizational rules that may be established by machine learning and/or artificial intelligence principles (e.g., statistical classifications, clustering, regression analysis, etc.) For example, a particular set of input data may be clustered according to a single-user. However, that same set of input data may also be clustered with a particular emotional state or a particular GPS location or other contextual setting. Upon receiving a user search inquiry, a report may be generated at the generate report operation 1008 according to the results from the analyze/compare operation 1006. This report may assume various forms depending on the type of search inquiry. For example, if a user searched for an overall emotional state analysis related to conversations with a specific work colleague, the report may take on the form of a pie chart (not pictured) with each section representing a different emotional state and its associated numerical proportion. In another example, if a user searched for all images that previously invoked a sense of inspiration, then the report generated in operation 1008 may assume the form of an image thumbnail list (not pictured). Finally, the generated report may be provided via the provide report operation 1010.

In one example aspect, the system 1000 may be automated. For example, a report may be generated for an employer every week, month, quarter, etc. In another example, individual reports on each student may be generated for a teacher every week, month, semester, etc. Alternatively, the system 1000 may be manually executed. A user may input specific parameters to receive a customizable report on specific data. For example, an employer may want to generate a report about a certain group of employees, or a teacher may want to generate a report on the level of student attention for a certain class or topic, or a manager may want to generate a report depicting the trend of morale for his employees during the course of a project.

As should be appreciated, the various devices, components, etc., described with respect to FIG. 10 are not intended to limit the systems and methods to the particular components described. Accordingly, additional topology configurations may be used to practice the methods and systems herein and/or components described may be excluded without departing from the methods and systems disclosed herein.

Figure 11:
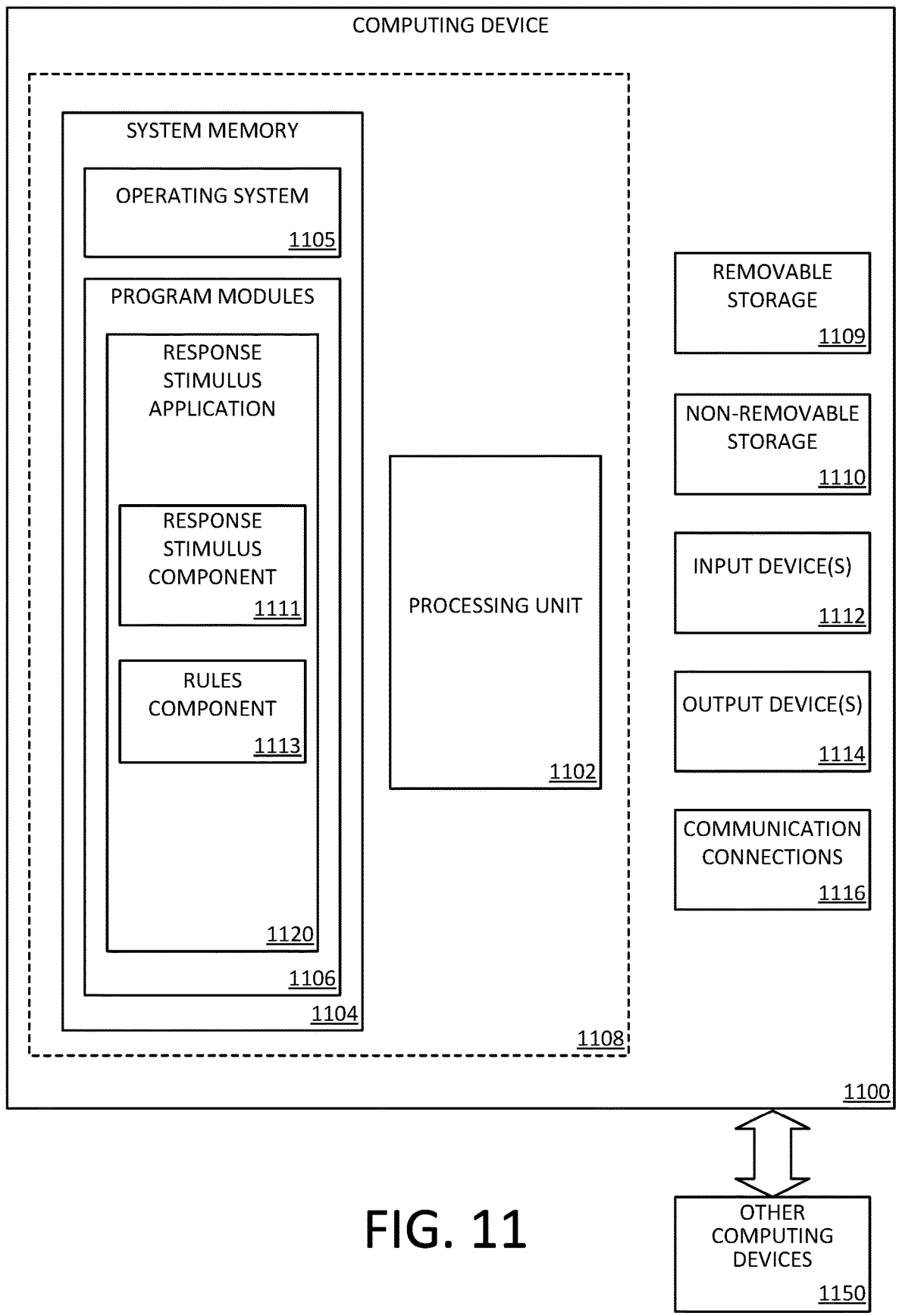
FIG. 11 is a block diagram illustrating example physical components of a computing device with which aspects of the disclosure may be practiced.

FIG. 11 is a block diagram illustrating physical components (e.g., hardware) of a computing device 1100 with which aspects of the disclosure may be practiced. The computing device components described below may have computer executable instructions for implementing a response stimulus application 1120 on a computing device, including computer executable instructions for response stimulus application 1120 that can be executed to implement the methods disclosed herein. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for performing the various aspects disclosed herein such as a response stimulus component 1111 for determining a response stimulus based upon a conversation, and a rules component 1113 for storing various rules used to determine a response stimulus.

The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., response stimulus 1120) may perform processes including, but not limited to, the aspects, as described herein. Other program modules that may be used in accordance with aspects of the present disclosure, and in particular for providing a response stimulus such as a response stimulus component 1111, a rules component 1113, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12A:
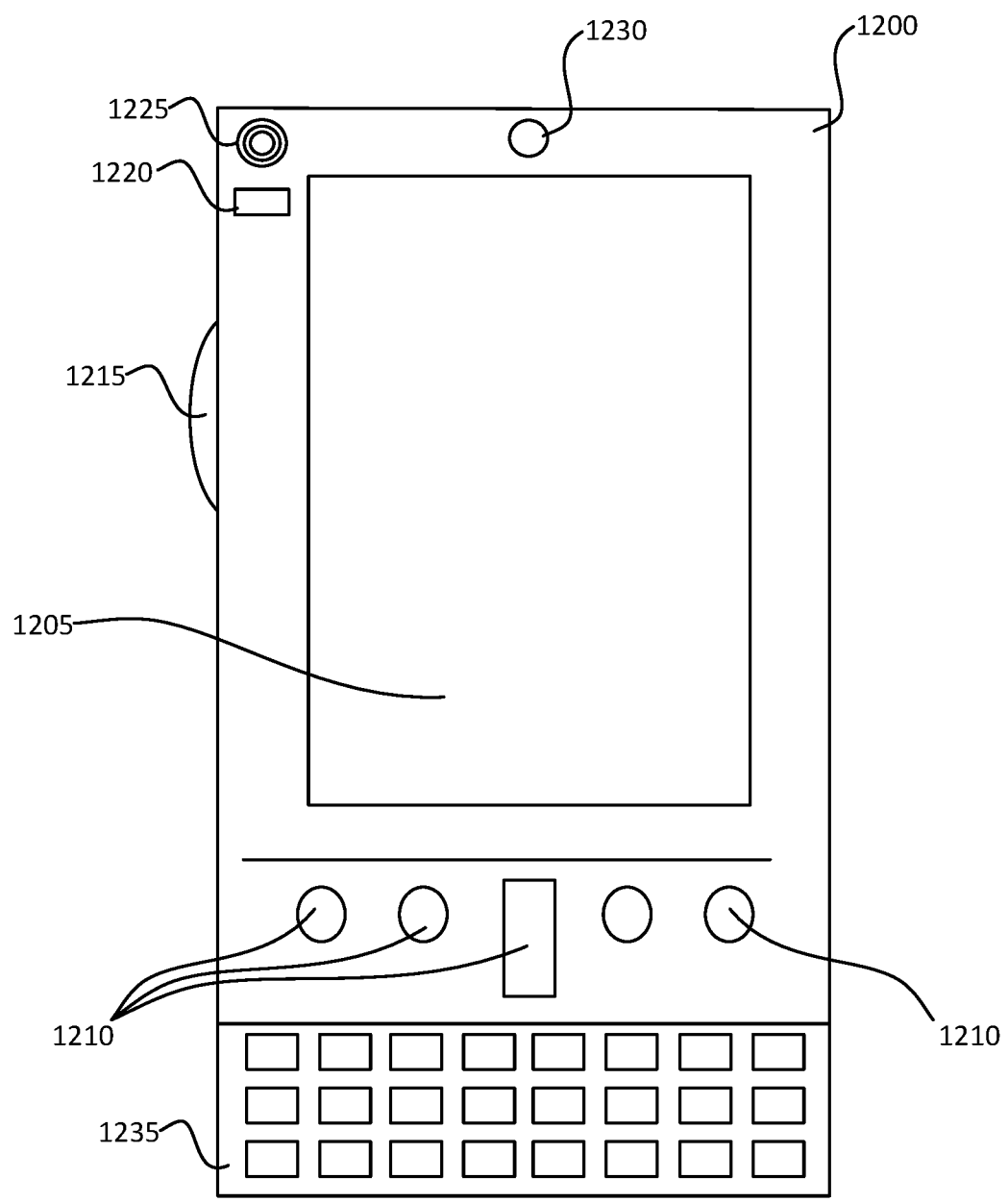
FIGS. 12A and 12B are simplified block diagrams of a mobile computing device with which aspects of the present disclosure may be practiced.
Figure 12B:
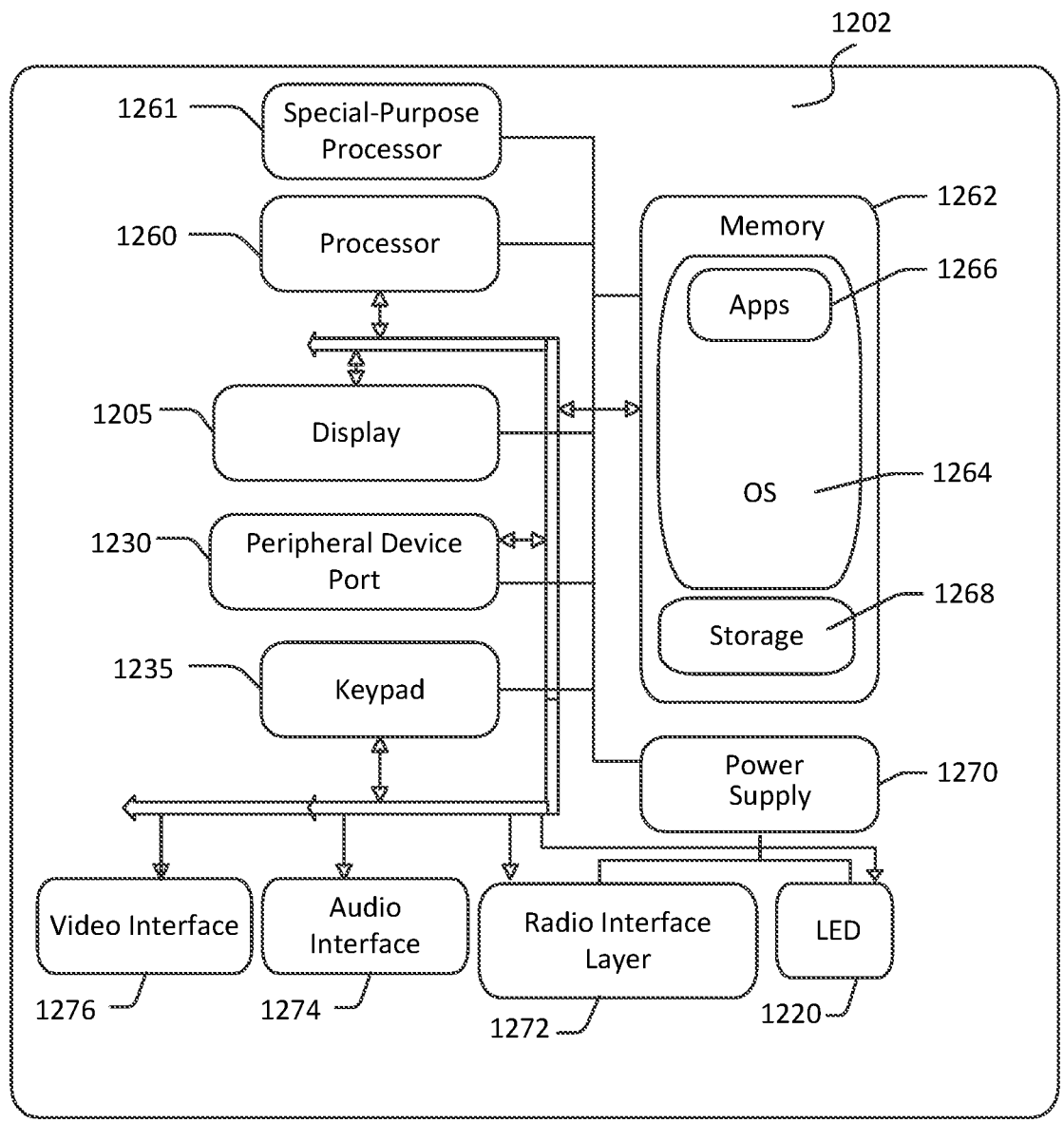

FIGS. 12A and 12B illustrate a mobile computing device 1200, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative aspects, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 1200 can incorporate a system (e.g., an architecture) 1202 to implement some aspects. In one embodiment, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as email or other messages used by an email application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the instructions for creating and sharing collaborative objects as described herein (e.g., task component, communication component, task product component, collaborative object component, permissions component, and/or UX component, etc.).

The system 1202 has a power supply 1270, which may be implemented as one or more batteries. The power supply 1270 may further include an external power source, such as an AC adapter or a powered docking cradle that supplements or recharges the batteries. The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator 1220 may be used to provide visual notifications, and/or an audio interface 1274 may be used for producing audible notifications via an audio transducer 1225 (e.g., audio transducer 1225 illustrated in FIG. 12A). In the illustrated embodiment, the visual indicator 1220 is a light emitting diode (LED) and the audio transducer 1225 may be a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of peripheral device 1230 (e.g., on-board camera) to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio interface layer 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

As should be appreciated, FIGS. 12A and 12B are described for purposes of illustrating the present methods and systems and are not intended to limit the disclosure to a particular sequence of steps or a particular combination of hardware or software components.

Figure 13:
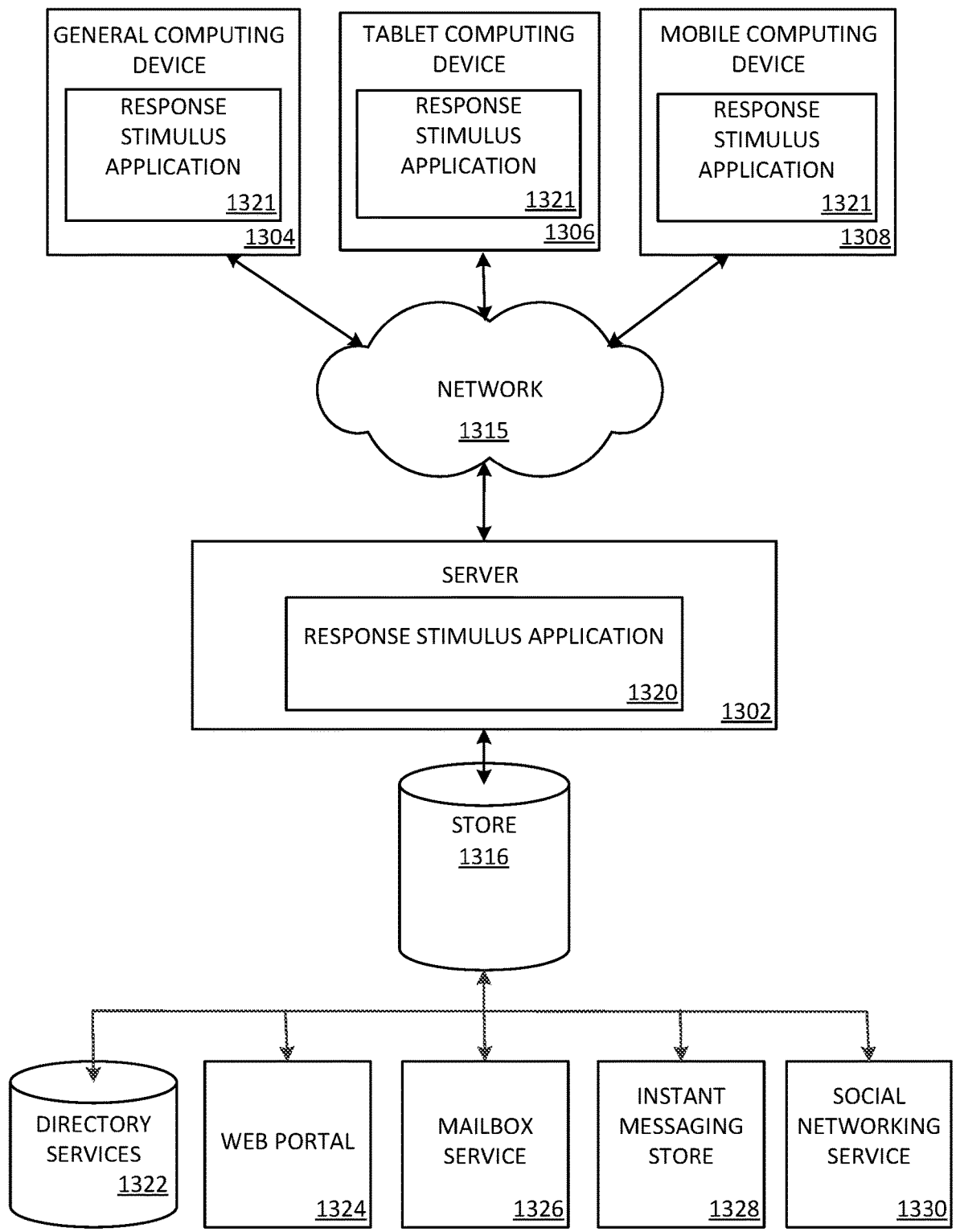
FIG. 13 is a simplified block diagram of a distributed computing system in which aspects of the present disclosure may be practiced.

FIG. 13 illustrates one aspect of the architecture of a system for processing data received at a computing system from a remote source, such as a general computing device 1304 (e.g., personal computer), tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking service 1330. The response stimulus application 1321 may be employed by a client that communicates with server device 1302, and/or the response stimulus 1320 may be employed by server device 1302. The server device 1302 may provide data to and from a client computing device such as a general computing device 1304, a tablet computing device 1306 and/or a mobile computing device 1308 (e.g., a smart phone) through a network 1315. By way of example, the computer system described above with respect to FIGS. 1-11 may be embodied in a general computing device 1304 (e.g., personal computer), a tablet computing device 1306 and/or a mobile computing device 1308 (e.g., a smart phone). Any of these embodiments of the computing devices may obtain content from the store 1316, in addition to receiving graphical data useable to either be pre-processed at a graphic-originating system or post-processed at a receiving computing system.

As should be appreciated, FIG. 13 is described for purposes of illustrating the present methods and systems and is not intended to limit the disclosure to a particular sequence of steps or a particular combination of hardware or software components.

In a first aspect, a system is provided. The system includes a processing unit and a memory storing computer executable instructions that, when executed by the processing unit, cause the system to perform actions. For instance, in response to the computer executable instructions, the system receives a task list for a project, where the task list includes a plurality of tasks, and creates a collaborative object including the task list. Additionally, the system associates a task to a document and receives an update to the document to complete the task. In response to receiving the update to the document, the system updates the task list to reflect completion of the task and provides a control for performing an action upon completion of the task list.

With further reference to the first aspect, in response to the computer executable instructions, the system may perform one or more of the following steps, or combinations thereof. For example, the system may share the collaborative object with one or more users and/or associate one or more communications with the collaborative object. Additionally, the system may determine that the plurality of tasks have been completed and receive a selection to perform the action upon completion of the task list. The system may further set one or more permissions on the collaborative object, where the one or more permissions limit access to one or more items associated with the collaborative object, including one or more of: allowing full read and write access to the collaborative object, allowing read access to the task list, allowing full read and write access to the task list, allowing read access to the document, allowing full read and write access to the document, allowing no access to the document, allowing read access to one or more communications associated with the collaborative object and allowing no access to one or more communications associated with the collaborative object. In some cases, in response to receiving the update to the document, the system may send a notification to at least one user. The task list may be received as a bulleted list or based on formatted text; in response to receiving the task list, the collaborative object may be automatically created or created upon a user selection.

In a second aspect, a method is provided. The method includes receiving a task list for a project, wherein the task list includes a plurality of tasks, and creating a collaborative object including the task list. The method further includes receiving at least one task product satisfying a task of the task list and associating the task product with the task in the collaborative object. Additionally, the method includes sharing the collaborative object with one or more users. The method may further include any combination of the above steps described with respect to the first aspect.

In yet a third aspect, a computer-readable storage medium is provided. The computer-readable storage medium stores computer executable instructions that, when executed by at least one processing unit, cause a computing device to receive a task list for a project, wherein the task list includes a plurality of tasks, and create a collaborative object including the task list. The computer executable instructions further causing the computing device to receive a communication related to the project and associate the communication with the collaborative object. Additionally, the computer executable instructions cause the computing device to receive a task product satisfying a task of the task list and associate the task product with the task in the collaborative object. Moreover, the computer-readable storage medium may include computer-executable instructions for performing any combination of the above steps described with respect to the first aspect.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processing unit; and
   at least one memory encoding computer executable instructions that, when executed by the at least one processing unit, causes the at least one processing unit to perform a method comprising:
   receiving input data, wherein the input data is related to a conversation between at least a first human participant and a second human participant;
   associating at least a first portion of the input data with the first human participant and a second portion of the input data with the second human participant;
   processing the input data, wherein processing the input data comprises determining, according to one or more rules, a first response stimulus for the first human participant based on an analysis of the first portion of the input data and a second response stimulus for the second human participant based on an analysis of the second portion of the input data;

providing the first response stimulus to the first human participant and the second response stimulus to the second human participant; and storing the input data, the first response stimulus, and the second response stimulus.

2. The system of claim 1, wherein receiving the input data comprises at least one of:

receiving data from at least one of the first and second human participants during said conversation;

receiving environment data; and receiving data from at least one electronic device associated with one of the first and second human participants.

3. The system of claim 2, wherein the input data comprises at least one of:

biometric data, wherein the biometric data comprises at least one of heart rate, heart rate variability, and galvanic skin response;

microphone data, wherein the microphone data comprises at least one of voice prosody, speech content, and other audio content;

visual data, wherein the visual data comprises at least one of facial expressions and body expressions;

textual data, wherein the textual data relates to the process of deriving high-quality information from text through the devising of patterns and trends through means such as statistical pattern learning;

participant actions, wherein the participant actions relate to a manner in which a participant is interacting with an electronic device or component;

participant role, wherein the participant role relates to the status or rank of at least the first human participant and the second human participant;

patterns and context, wherein the patterns and context comprises at least one of prior data regarding the participants to the conversation; and solicited feedback from participants to the conversation.

4. The system of claim 2, wherein the environment data comprises:

characteristics of an educational environment, wherein the characteristics may comprise at least one of a classroom, a lecture hall, an auditorium, a chalkboard, desks, a projector, and other educationally-related materials.

5. The system of claim 2, wherein the electronic device comprises at least one of:

a wearable device;

a mobile phone;

a conferencing device;

a tablet; and a personal computer.

6. The system of claim 1, wherein processing the input data comprises at least one of:

converting raw input data to machine-readable data;

manipulating the machine-readable data to extract pertinent data;

comparing the pertinent data with previously stored data; and saving said pertinent data.

7. The system of claim 6, wherein comparing the pertinent data with previously stored data comprises:

generating a result based on the comparison of said pertinent data with said previously stored data, wherein the determination of the first response stimulus and the second response stimulus is based at least in part on the result.

8. The system of claim 1, wherein providing the first response stimulus and the second response stimulus comprises:

sending the first response stimulus as a first private message to the first human participant in the conversation, wherein the first private message comprises at least one of text, pictures, audio output, and video output; and sending the second response stimulus as a second private message to the second human participant in the conversation, wherein the second private message comprises at least one of text, pictures, audio output, and video output.

9. The system of claim 1, wherein providing the first response stimulus and the second response stimulus comprises:

sending one or more of the first response stimulus and the second response stimulus as one or more public messages to at least the first human participant and the second human participant.

10. The system of claim 1, wherein the method further comprises:

at a later time, analyzing the stored input data, the first response stimulus, and the second response stimulus to update the one or more rules.

11. The system of claim 10, wherein the first response stimulus or the second response stimulus comprises at least one of:

a text message;

an audio message;

an image; and a video.

12. The system of claim 1, wherein the method further comprises:

using at least one of the input data or environment data to activate at least one or more data-retrieval sensors of a plurality of data-retrieval sensors connected to a device; and using at least one of the input data or environment data to turn off at least one or more other data-retrieval sensors of the plurality of data-retrieval sensors connected to the device.

13. The system of claim 1, wherein providing the first response stimulus to the first human participant comprises sending the first response stimulus to a device associated with the first human participant, and providing the second response stimulus to the second human participant comprises sending the second response stimulus to a device associated with the second human participant.

14. A method for maintaining a searchable content repository, the method comprising:

aggregating data associated with a plurality of human participants and conversations for storage in a content repository;

receiving, from a requesting device, a query through a search interface for data associated with a first human participant during a conversation between the first human participant and at least a second human participant; and in response to receiving the query, retrieving the data associated with the first human participant during the conversation from the content repository and providing the retrieved data to the requesting device, the data including a response stimulus determined based at least in part on a portion of the data associated with the first human participant and provided to the first human participant during the conversation to facilitate the first human participant's interaction with at least the second human participant in the conversation.

15. The method of claim 14, wherein said data associated with the first human participant comprises at least one of:
a mood of the first human participant in the conversation;
a total talking time during the conversation for the first human participant; and
an emotional sensitivity of the first human participant.

16. The method of claim 14, further comprising, in response to the query, providing information about one or more additional human participants in the conversation.

17. A computer storage medium encoding computer executable instructions that when executed by at least one processor, perform a method comprising:
receiving input data, wherein the input data is related to a conversation between at least a first human participant and a second human participant;
associating at least a first portion of the input data with the first human participant and a second portion of the input data with the second human participant;
processing the input data, wherein processing the input data comprises determining a first response stimulus for the first human participant based on the first portion of the input data and a second response stimulus for the second human participant based on the second portion of the input data;
providing the first response stimulus to the first human participant and the second response stimulus to the second human participant; and
storing aggregate data, wherein the aggregate data comprises previously-stored data, the first portion of the input data, the second portion of the input data, the first response stimulus, and the second response stimulus.

18. The computer storage medium of claim 17, wherein the first response stimulus or the second response stimulus comprises at least one of:
a text message;
an audio message;
an image; and
a video.

19. The computer storage medium of claim 17, the method further comprising:
setting one or more permissions on said aggregate data, wherein the one or more permissions limit access to the aggregate data.

20. The computer storage medium of claim 19, the method further comprising:
allowing full read and write access to said aggregate data;
allowing read access to said aggregate data; and
allowing no access to said aggregate data.

* * * * *